United States Patent [19]

Kasori et al.

[11] Patent Number: 5,001,089

[45] Date of Patent: Mar. 19, 1991

[54] ALUMINUM NITRIDE SINTERED BODY

[75] Inventors: Mituo Kasori, Kawasaki; Kazuo Shinozaki, Inagi, both of Japan; Kazuo Anzai, Worcester, Mass.; Akihiko Tsuge, Yokohama, Japan; Hiroshi Imagawa, Tsurugashima, Japan; Takeshi Takano, Kanagawa, Japan; Fumio Ueno, Yokohama, Japan; Akihiro Horiguchi, Kawasaki, Japan; Hiroshi Inoue, Kawaguchi, Japan

[73] Assignee: Kabushiki Kaisha Toshiba, Kawasaki, Japan

[21] Appl. No.: 402,844

[22] Filed: Sep. 6, 1989

Related U.S. Application Data

[63] Continuation-in-part of Ser. No. 157,150, Feb. 11, 1988, Pat. No. 4,883,780.

[51] Int. Cl.[5] .................... C04B 35/58; C04B 35/50; C04B 35/46; C04B 35/48

[52] U.S. Cl. .................... 501/96; 501/98; 501/152

[58] Field of Search .................... 501/96, 98, 152

[56] References Cited

U.S. PATENT DOCUMENTS

| | | | |
|---|---|---|---|
| 4,591,537 | 5/1986 | Aldinger et al. | 501/96 |
| 4,605,633 | 8/1986 | DeAngelis | 501/96 |
| 4,615,863 | 10/1986 | Inoue et al. | 501/96 |
| 4,618,592 | 10/1986 | Kuramoto et al. | 501/96 |

FOREIGN PATENT DOCUMENTS

| | | | |
|---|---|---|---|
| 75857 | 4/1983 | European Pat. Off. | |
| 114193 | 8/1984 | European Pat. Off. | |
| 115688 | 8/1984 | European Pat. Off. | 501/96 |
| 51-33130 | 9/1976 | Japan | 501/96 |
| 58-055376 | 4/1983 | Japan | |
| 60-151281 | 8/1985 | Japan | 501/96 |

OTHER PUBLICATIONS

Kuramoto, N. et al., "Transparent AIN Ceramics", Journal of Materials Science Letters 3 (1984), pp. 471–474.

Komeya et al., "Role of $Y_2O_3$ and $SiO_2$ Additions in Sintering AIN", JACS, vol. 57, No. 9, Sep. 1974.

*Primary Examiner*—Mark L. Bell

*Attorney, Agent, or Firm*—Foley & Lardner

[57] ABSTRACT

There is disclosed an aluminum sintered body prepared by sintering aluminum nitride and additives, which consists essentially of (a) aluminum nitride, (b) at least one compound selected from the group consisting of an aluminum compound of a rare earth metal, an aluminum compound of an alkaline earth metal, and an aluminum compound of a rare earth metal and an alkaline earth metal, and (c) at least one element selected from the transition elements consisting of Groups IVa, Va, VIa, VIIa and VIII of the periodic table, and/or at least one compound comprising the element, and the rare earth element, alkaline earth element and transition element are supplied by the additives.

10 Claims, 11 Drawing Sheets

10μm

ALUMINUM NITRIDE SINTERED BODY

This application is a continuation-in-part of Ser. No. 07/157,150, filed Feb. 11, 1988, issued as U.S. Pat. No. 4,883,780.

BACKGROUND OF THE INVENTION

The present invention relates to a sintered body of aluminum nitride and a process for preparing the same, more particularly to a sintered body of aluminum nitride which is dense and excellent in thermal conductivity and a process for preparing the same.

Since aluminum nitride (AlN) deteriorates little in strength at a room temperature to a high temperature and is exellent in chemical resistance, it is used on one hand as a heat-resistant material, and on the other hand is considered to be promising as a material for heat dissipating substrates of semiconductor devices through the utilization of its properties of high thermal conductivity and good electrical insulation. AlN having the above-described properties usually has no melting point and decomposes at a high temperature of not lower than 2200° C., and therefore, it is used in the form of a sintered body except for the use as thin films.

Said AlN sintered body is usually prepared by molding and sintering an AlN powder. However, when the AlN powder is used singly, sinterability thereof is not good, and therefore, it is impossible to obtain a sintered body which is dense or has a high density except for the case where the hot pressing method is employed. Therefore, in the case of sintering under atmospheric pressure, it is generally practiced to add an oxide of a rare earth metal or an oxide of an alkaline earth metal as a sintering aids to the AlN powder for the purpose of making sintered body denser.

Such an addition of a sintering aids has certainly improved the density of the sintered body to a considerable degree. However, on the other hand, up to today, the thermal conductivity of such AlN sintered bodies has been lower than that of expected due to the presence of oxygen and other impurities and of boundary area of AlN crystal particles. Namely, there is a problem that theoretical thermal conductivity of AlN is 320 W/m·k, whereas that of an AlN sintered body is 40 W/m·k at highest.

Therefore, for the purpose of improving thermal conductivity of AlN sintered bodies, various kinds of attempts have been made. However, no AlN sintered bodies which are satisfactory enough have been obtained.

SUMMARY OF THE INVENTION

An object of the present invention is to provide an AlN sintered body having a high density and a high thermal conductivity and a process for preparing the same by solving the above-described problems that have existed heretofore.

A further object of the present invention is to provide an AlN sintered body having a dark color.

In order to attain this object, the present inventors have investigated extensively into the relationships of sintering additives to be added to AlN powders and to densities and thermal conductivities of the resulting sintered bodies, which led to the following findings.

Namely, there has been found the fact that if sintering is carried out by adding to an AlN powder, a transition element of Groups IVa, Va, VIa, VIIa and VIII of the periodic table or a compound containing the above elements, as a sintering aids, together with a compound of a rare earth metal or a compound of an alkaline earth metal, it becomes possible to sinter at a lower temperature than would be the case with conventional processes where an oxide of alkaline earth metal or a rare earth metal is added singly, and the resulting AlN sintered body is dense and has a high thermal conductivity.

Namely, the aluminum nitride sintered body of the present invention is prepared by sintering aluminum nitride and additives, which consists essentially of (a) aluminum nitride, (b) at least one compound selected from the group consisting of an aluminum compound of a rare earth metal, an aluminum compound of an alkaline earth metal, and an aluminum compound of a rare earth metal and an alkaline earth metal, and (c) at least one element selected from the transition elements consisting of Groups IVa, Va, VIa, VIIa and VIII of the periodic table, and/or at least one compound comprising said element; and said rare earth element, alkaline earth element and transition element are supplied by said additives, and the process for preparing the aluminum nitride sintered body comprises (1) mixing aluminum nitride with;

(i) at least one compound selected from the group consisting of a rare earth metal and/or an alkaline earth metal, and (ii) at least one selected from the group consisting of the transition elements of Groups IVa, Va, VIa, VIIa and VIII of the periodic table, and the compounds containing the above transition element, and then molding and sintering the mixture.

DESCRIPTION OF THE PREFERRED EMBODIMENTS

Figure 1:
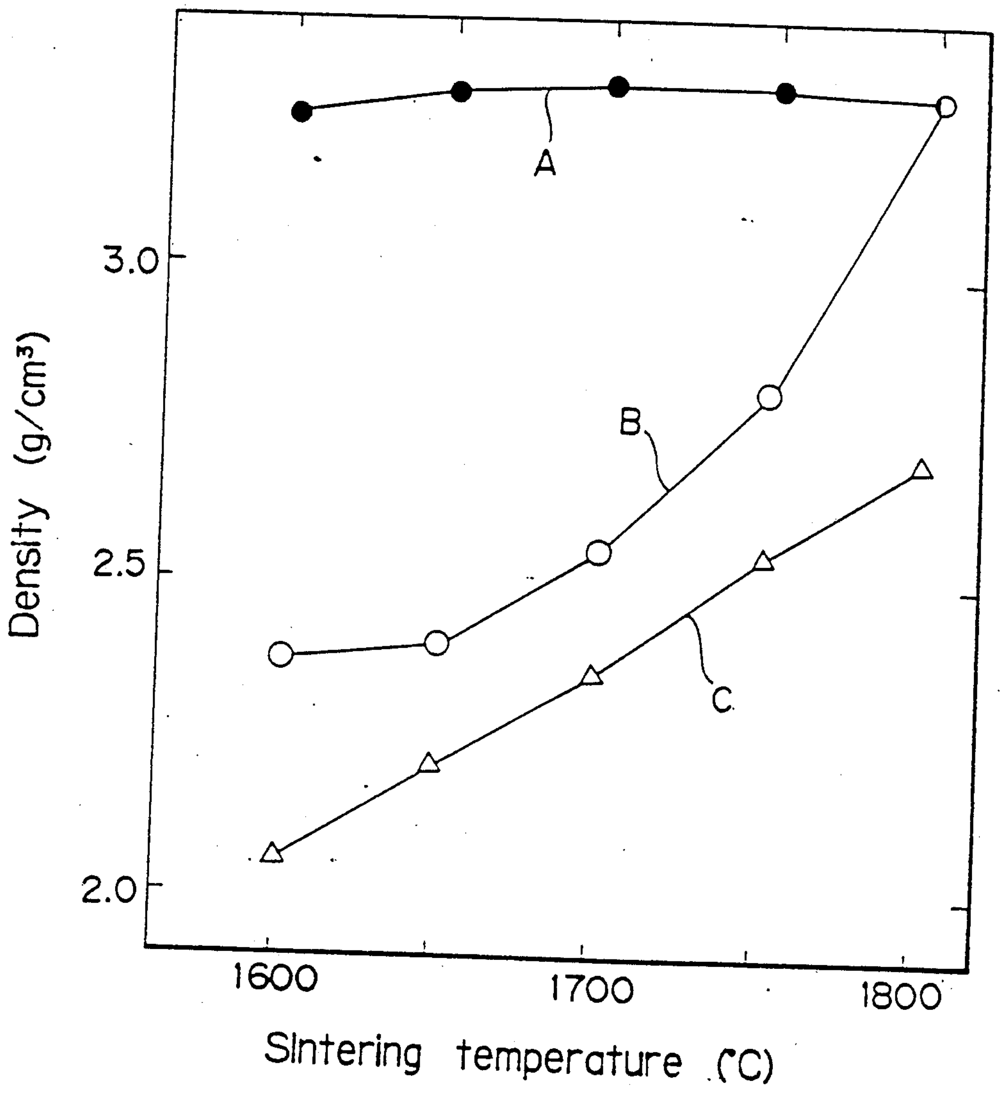
FIG. 1, FIG. 3, FIG. 5, FIG. 7 and FIG. 9 are characteristic diagrams showing the relationships of the sintering temperature of AlN sintered bodies prepared in Examples 94, 95, 96, 97 and 98 and Comparative Examples 19, 20, 21, 22 and 23 to the densities thereof.

The microscopic investigation of the AlN sintered body of the present invention shows that in the boundary area of AlN crystal particles, there are formed compounds such as an aluminum compound of a rare earth metal and/or an aluminum compound of an alkaline earth metal and/or an oxides of an aluminum compound of a rare earth metal and an alkaline earth metal and/or an oxyfluoride thereof, and compounds containing a transition element of Groups IVa, Va, VIa, VIIa and VIII in the periodic table.

In the AlN sintered body described above, if a rare earth metal contained therein is, e.g., yttrium (Y), said oxides of aluminum compounds thereof are compounds such as $3Y_2O_3{\cdot}5Al_2O_3$, $Y_2O_3{\cdot}Al_2O_3$, and the like, and also if $YF_3$ is added, besides the compounds composed of $Y_2O_3$ and $Al_2O_3$, there is formed YOF. On the other hand, if said alkaline earth element is, e.g., calcium (Ca), similarly, there are produced compounds such as $6Al_2O_3 \cdot CaO$, $2Al_2O_3 \cdot CaO$, $Al_2O_3 \cdot CaO$ and the like. Further, if said transition element or compound added is Zr or $ZrO_2$, the compounds containing said transition element become ZrN, or an unknown phase, etc., while if said transition element or compound is Ti or $TiO_2$, the compounds become TiN, an unknown phase, etc.

Further, in such AlN sintered bodies, the composition ratio of the principal component, AlN crystal particles, is preferably 80 to 99.98% by weight relative to the whole. If this composition ratio is less than 80% by weight, the characteristics of AlN itself cannot be obtained sufficiently, whereas if the ratio exceeds 99.98% by weight, it becomes difficult to allow the additives to achieve their effects sufficiently.

Next, the process for preparing an AlN sintered body of the present invention is described hereinafter.

The gist of the preparative method of the present invention comprises mixing the principal component of aluminum nitride with, as a first additive, at least one compound selected from the group consisting of the compounds containing a rare earth metal and/or an alkaline earth metal, and as a second additive, at least one element selected from the group consisting of a transition element of Groups IVa, Va, VIa, VIIa and VIII in the periodic table or a compound containing the above elements; and then molding and sintering the mixture.

In the first place, as an AlN powder, which is a principal component, the use of one which contains 0.001 to 7% by weight of oxygen is particularly preferable, when sinterability and thermal conductivity being taken into account.

And, as a rare earth metal to be contained in the first additive, there may be mentioned Y, La, Ce, Sm, Dy, Nd, Gd, Pr, Ho, Er, Yb, etc., and particularly, Y, La and Ce are preferable. In addition, as an alkaline earth metal, there may be mentioned Be, Mg, Ca, Sr, Ba, etc., and particularly, Ca, Sr and Ba are preferable. One kind or two or more kinds of these elements are added to said AlN powder. As a compound of these elements, an oxide, a nitride, a fluoride, and a substance which is converted into a compound mentioned above by sintering are preferable. As a substance which is converted, e.g., into an oxide by sintering, there may be mentioned a carbonate, a nitrate, an oxalate, a hydroxide, etc. of these elements.

Next, as a transition element contained in the second additive, any element may be used so long as it belongs to Groups IVa (Ti, Zr and Hf), Va (V, Nb and Ta), VIa (Cr, Mo and W) or VIIa (Mn and Re), or VIII (Fe, Co, Ni, Ru, Rh, Pd, Os, Ir and Pt), and as is the case with said first additive, one kind or two or more kinds of the above-mentioned elements is (or are) added to said AlN powder as a compound powder. In addition, among these transition elements, the use of an element of Group VIa, i.e. Ti, Zr or Hf gives an AlN sintered body which has not only a high density and a good thermal conductivity but also an extremely high strength. Among them, Zr and Ti are particularly preferred. On the other hand, among the above-mentioned transition elements, if one which belongs to the fourth period, or Ti, V, Cr, Mn, Fe, Co or Ni, is used, at a sintering temperature lower than conventional temperatures, e.g., at 1600° to 1650° C., there can be produced an AlN sintered body which has a high density and a good thermal conductivity.

The above-mentioned first and second additives are preferably added in the range of 0.01 to 18% by weight and 0.01 to 15% by weight, more preferably in the range of 0.01 to 15% by weight and 0.01 to 10% by weight, respectively, in terms of oxides of respective elements In addition, the total amount of both the additives is preferably 0.02 to 20% by weight, more preferably 0.02 to 18% by weight. If the amounts of the additives are less than 0.01% by weight for each of them, the additives do not exert their effects sufficiently, whereas the amounts are excessively great, not only the thermal resistance and the high strength property are deteriorated but also the thermal conductivity is lowered, which is not preferable. If the amount of the second additive is great, there is a danger of the electrical insulating properties of products being disadvantageously lowered.

All the average particle diameters of the AlN powder and powders of the first and second additives are not more than 5 μm, preferably not more than 4 μm.

Hereinafter, an example of the process for preparing an AlN sintered body of the present invention will be described.

In the first place, a powder composed of a rare earth metal compound and/or an alkaline earth metal compound described above, and at least one element selected from the group consisting of Groups IVa to VIII in the periodic table or a compound containing the above elements is added, as sintering additive, to an AlN powder, in a predetermined amount, followed by blending using a ball mill, etc. For sintering, the atmospheric pressure sintering method, the hot pressing method, etc. can be employed. When the atmospheric pressure sitnering method is employed, a binder is added to the powder mixture, and the resulting mixture is kneaded, granulated, sized, and then molded. As a molding method, press-molding using a molding die, hydrostatic pressure press-molding, sheet forming, etc. can be applied. And then, a molded piece is heated under a stream of $N_2$ gas to remove the binder, followed by atmospheric pressure sintering. The sintering temperature is normally set at 1650° to 1800° C., however, this depends on the kinds of additives used.

On the other hand, when the hot pressing method is employed, direct hot pressing of said material admixed using a ball mill, etc. may be employed.

Although the improving effect of the present invention on thermal conductivity of an AlN sintered body and the lowering effect thereof on sintering temperature are unknown at present; however, the cause of enhanced thermal conductivity is presumed as follows.

Namely, a principal cause of enhancing the thermal conductivity is that in the AlN sintered body of the present invention, the oxynitride of Al (AlON) and polytype of AlN (27R type) are hard to be formed. The results of the research by the present inventors show that all the sintered bodies in which AlON and 27R type are formed are low in thermal conductivity.

The formation of AlON and 27R type is influenced by the purity of AlN powder, atmosphere in a sintering furnace, and the kind and amount to be added of sintering aids. However, comparison of the sintered bodies prepared using the same AlN powder and under the same experimental conditions shows that compared with the case where a conventional oxide of a rare earth metal and an oxide of an alkaline earth metal are added, the sintered body of the present invention has evidently less or no AlON and 27R type formed therein.

On the other hand, the lowering of sintering temperature is presumably caused by the fact that in the present invention, sintering proceeds by producing liquid phase at a lower temperature than when an oxide of a rare earth metal or an oxide of an alkaline earth metal are added singly.

Further, the sintered body of the present invention is colored by incorporating a transition element which is the second additive, and moreover, the tone can be varied depending the kinds of elements to be added, amounts and combinations thereof. Namely, in general, the molar ratio of Al/N in an AlN material is not necessarily 1, and in many cases, rich in Al. Therefore, when such a material is used, the color of a sintered body becomes grey or black. In addition, usually, the richer in Al the material is, the more the blackening proceeds on one hand and the lower the thermal conductivity becomes on the other hand. Accordingly, the closer to 1 the molar ratio of Al/N in an AlN material is and the less amounts of impurities are contained therein, the higher the thermal conductivity becomes and the whiter or translucent sintered bodies are obtained. Namely, conventionally, if the preparation of a sintered body of a higher conductivity is attempted, the color of the resulting sintered body is necessarily white or translucent, while the preparation of a colored sintered body is attempted, thermal conductivity is lowered. In contrast, according to the present invention, the simultaneous addition of an alkaline earth metal and/or a rare earth metal and a transition metal makes it possible to prepare a sintered body having various colors by suitably selecting the kind or combination of elements to be added while preserving a high thermal conductivity through the use of an AlN material of which the molar ratio of Al/N is close to 1 and which has a small amount of impurities. For example, the addition of $Cr_2O_3$, etc. develops a dark grey color, whereas the addition of $TiO_2$ develops a dark brown color. On the other hand, the addition of $Eu_2O_3$, $Sm_2O_3$, etc. develops a pale red color and the simultaneous addition of $TiO_2$ and $Cr_2O_3$ gives a dark grey to a black sintered body. Thus, according to the present invention, it is possible to prepare an AlN sintered body showing a desired color. For example, in a circuit substrate which contains inner conductive layer for loading on a semiconductor, it is required that the AlN layer be opaque. Also, it is required to have no color unevenness or sintering unevenness. If the sintered body is white, the AlN layer stains with the dirt such as fingerprint. In the present invention, uniform coloring with a dark color can be realized by adding a rare earth element and/or an alkaline earth metal as well as a transition element, particularly an element of group IVa (further particularly Ti) as additives.

The AlN sintered body thus colored has such advantages as being higher in thermal emissivity, whereby the property of heat dissipation is further improved, a light which becomes a factor of an error of a semiconductor circuit is shielded and being able to avoid unevenness of color of the sintered body, etc. during preparation by coloring, whereby the appearance of products can be enhanced.

EXAMPLES

EXAMPLE 1

To an AlN powder containing 3.6% by weight of oxygen as an impurity, and having an average particle diameter of 2.2 μm, there were added, as a first additive, 3% by weight of $Y_2O_3$ having an average particle diameter of 2.5 μm and, as a second additive, 0.5% by weight of $ZrO_2$ having an average particle diameter of 3 μm, and the mixture was ground and admixed using a ball mill to prepare a material. Next, to this material, there was added 7% by weight of paraffin as a binder and the resulting mixture was granulated, followed by press-molding the granule under a pressure of 300 kg/cm$^2$ to preresulting pare a green compact of 50×50×8 mm. This green compact was heated up to 700° C. under an atmosphere of nitrogen gas to remove the paraffin. Further, the resulting compact was placed in a container made of carbon, and under nitrogen gas atmosphere, subjected to atmospheric pressure sintering at 1800° C. for 2 hours. The density of the resulting AlN sintered body was measured. Further, a disc having a diameter of 10 mm and a thickness of 2.5 mm was prepared by grinding from the sintered body, and the thermal conductivity was measured by laser-flash method using the disc as a specimen.

On the other hand, six square bars having a width of 4 mm, a thickness of 3 mm and a length of 40 mm were prepared by grinding from the sintered body obtained, and the three-point bending strength was measured using the square bars as specimen for measuring bending strength, under the condition of a supporting-points-distance of 20 mm, and a crosshead velocity of 0.5 mm/min. The results are shown in Table 1.

EXAMPLES 2 to 28 and COMPARATIVE EXAMPLES 1 to 5

By changing the kind of AlN powder and that of sintering additive powder variously, AlN sintered bodies were prepared similarly to Example 1 described above, and the density, thermal conductivity and 3-point bending strength thereof were also measured. The results are shown in Table 1 together with the particle diameter and oxygen content of each AlN powder, and the kind of additives, particle diameter and amount to be added of each additive.

TABLE 1

| | AlN powder | | | First additive | | | Second additive | | |
|---|---|---|---|---|---|---|---|---|---|
| | Average particle diameter (μm) | Oxygen content (% by weight) | Composition (% by weight) | Kind | Average particle diameter (μm) | Composition (% by weight) | Kind | Average particle diameter (μm) | Composition (% by weight) |
| Example 1 | 2.2 | 3.6 | 96.5 | $Y_2O_3$ | 2.5 | 3.0 | $ZrO_2$ | 3.0 | 0.5 |
| Example 2 | 2.2 | 3.6 | 96.0 | $Y_2O_3$ | 2.5 | 3.0 | $ZrO_2$ | 3.0 | 1.0 |
| Example 3 | 2.2 | 3.6 | 94.0 | $Y_2O_3$ | 2.5 | 3.0 | $ZrO_2$ | 3.0 | 3.0 |
| Example 4 | 2.2 | 3.6 | 91.0 | $Y_2O_3$ | 2.5 | 3.0 | $ZrO_2$ | 3.0 | 6.0 |
| Example 5 | 2.2 | 3.6 | 87.0 | $Y_2O_3$ | 2.5 | 3.0 | $ZrO_2$ | 3.0 | 10.0 |
| Example 6 | 2.2 | 3.6 | 85.0 | $Y_2O_3$ | 2.0 | 10.0 | $ArO_2$ | 3.0 | 5.0 |

TABLE 1 -continued

| | | | | | | | | | |
|---|---|---|---|---|---|---|---|---|---|
| Example 7 | 2.2 | 3.6 | 80.0 | $Y_2O_3$ | 2.5 | 10.0 | $ZrO_2$ | 3.0 | 10.0 |
| Example 8 | 1.6 | 2.4 | 95.0 | $La_2O_3$ | 2.5 | 4.0 | $TiO_2$ | 2.8 | 1.0 |
| Example 9 | 1.2 | 1.4 | 90.0 | $Dy_2O_3$ | 2.5 | 8.0 | $HfO_2$ | 2.0 | 2.0 |
| Example 10 | 1.2 | 1.4 | 90.0 | $Sm_2O_3$ | 2.5 | 7.0 | $TiO_2$ | 2.8 | 3.0 |
| Example 11 | 2.2 | 3.6 | 98.0 | $Y_2O_3$ | 2.5 | 1.5 | $ArO_2$ | 3.0 | 0.5 |
| Example 12 | 2.2 | 3.6 | 96.0 | $La_2O_3$ | 2.5 | 3.0 | $ArO_2$ | 3.0 | 1.0 |
| Example 13 | 1.2 | 1.0 | 95.0 | $CaCO_3$ | 2.0 | 1.0 | $ArO_2$ | 3.0 | 3.0 |
| Example 14 | 2.2 | 3.0 | 88.9 | $CaCO_3$ | 2.0 | 1.0 | $ZrO_2$ | 3.0 | 0.1 |
| Example 15 | 2.2 | 3.0 | 98.0 | $CaCO_3$ | 2.0 | 1.0 | $ZrO_2$ | 3.0 | 1.0 |
| Example 16 | 2.2 | 3.0 | 96.0 | $CaCO_3$ | 2.0 | 1.0 | $ZrO_2$ | 2.0 | 3.0 |
| Example 17 | 2.2 | 3.0 | 94.0 | $CaCO_3$ | 2.0 | 1.0 | $ZrO_2$ | 3.0 | 5.0 |
| Example 18 | 2.2 | 3.0 | 89.0 | $CaCO_3$ | 2.0 | 1.0 | $ZrO_2$ | 3.0 | 10.0 |
| Example 19 | 2.2 | 3.0 | 96.9 | $CaCO_3$ | 2.0 | 0.1 | $ZrO_2$ | 3.0 | 3.0 |
| Example 20 | 2.2 | 3.0 | 94.0 | $CaCO_3$ | 2.0 | 3.0 | $ZrO_2$ | 3.0 | 3.0 |
| Example 21 | 2.2 | 3.0 | 92.0 | $CaCO_3$ | 2.0 | 5.0 | $ZrO_2$ | 3.0 | 3.0 |
| Example 22 | 2.2 | 3.0 | 87.0 | $CaCO_3$ | 2.0 | 10.0 | $ZrO_2$ | 3.0 | 3.0 |
| Example 23 | 2.2 | 3.0 | 82.0 | $CaCO_3$ | 2.0 | 15.0 | $ZrO_2$ | 3.0 | 3.0 |
| Example 24 | 1.5 | 1.4 | 86.0 | $CaCO_3$ | 2.0 | 1.0 | $TiO_2$ | 2.8 | 3.0 |
| Example 25 | 1.5 | 1.4 | 86.0 | $SrCO_3$ | 1.6 | 1.0 | $ZrO_2$ | 3.0 | 3.0 |
| Example 26 | 2.2 | 3.0 | 96.0 | $Ca_3N_2$ | 5.0 | 1.0 | $ZrO_2$ | 3.0 | 3.0 |
| Example 27 | 2.2 | 3.0 | 95.0 | $Ca_3N_2$ | 7.0 | 2.0 | $ZrO_2$ | 3.0 | 3.0 |
| Example 28 | 2.2 | 3.0 | 95.0 | $CaCO_3$ | 2.0 | 1.0 | $ZrF_4$ | 5.0 | 4.0 |
| Comparative example 1 | 2.2 | 3.6 | 97.0 | $Y_2O_3$ | 2.5 | 3.0 | — | — | — |
| Comparative example 2 | 2.2 | 3.6 | 97.0 | $La_2O_3$ | 2.5 | 3.0 | — | — | — |
| Comparative example 3 | 1.2 | 1.0 | 100.0 | — | — | — | — | — | — |
| Comparative example 4 | 1.2 | 1.0 | 98.0 | $CaCO_3$ | 2.0 | 1.0 | — | — | — |
| Comparative example 5 | 1.2 | 1.0 | 97.0 | — | — | — | $ZrO_2$ | 3.0 | 3.0 |

| | Density ($g/cm^3$) | Thermal conductivity (W/m.k) | Strength ($kg/mm^2$) | Color |
|---|---|---|---|---|
| Example 1 | 3.30 | 75 | 55 | dark gray |
| Example 2 | 3.30 | 75 | 58 | " |
| Example 3 | 3.32 | 74 | 60 | " |
| Example 4 | 3.35 | 73 | 59 | " |
| Example 5 | 3.40 | 70 | 59 | " |
| Example 6 | 3.38 | 75 | 55 | " |
| Example 7 | 3.42 | 72 | 55 | " |
| Example 8 | 3.30 | 70 | 56 | dark brown |
| Example 9 | 3.37 | 91 | 58 | dark gray |
| Example 10 | 3.37 | 94 | 57 | dark brown |
| Example 11 | 3.28 | 65 | 60 | dark gray |
| Example 12 | 3.30 | 60 | 58 | " |
| Example 13 | 3.29 | 110 | 58 | " |
| Example 14 | 3.27 | 80 | 55 | " |
| Example 15 | 3.29 | 78 | 58 | " |
| Example 16 | 3.33 | 76 | 60 | " |
| Example 17 | 3.38 | 75 | 62 | " |
| Example 18 | 3.45 | 73 | 60 | " |
| Example 19 | 3.20 | 70 | 52 | " |
| Example 20 | 3.34 | 75 | 58 | " |
| Example 21 | 3.35 | 76 | 59 | " |
| Example 22 | 3.37 | 72 | 58 | " |
| Example 23 | 3.40 | 70 | 56 | " |
| Example 24 | 3.29 | 95 | 56 | " |
| Example 25 | 3.35 | 96 | 59 | dark brown |
| Example 26 | 3.33 | 78 | 60 | " |
| Example 27 | 3.34 | 80 | 59 | " |
| Example 28 | 3.38 | 73 | 61 | " |
| Comparative example 1 | 3.30 | 65 | 45 | grayish white |
| Comparative example 2 | 3.30 | 60 | 45 | grayish white |
| Comparative example 3 | 2.35 | 18 | 15 | white |
| Comparative example 4 | 3.27 | 115 | 45 | grayish white |
| Comparative example 5 | 2.81 | 35 | 18 | dark brown |

EXAMPLE 29

To the AlN powder used in Example 13, there were added 0.5 by weight of $CaCO_3$ having an average particle diameter of 2 μm and 3.0% by weight of $ZrO_2$ having an average particle diameter of 3.0 μm, and the powders was ground and mixed using a ball mill to prepare a mixture. Next, the mixture was press-molded under a pressure of 300 kg/cm$^2$ into a green compact of 50×50×8 mm. And then, the green compact was placed in a carbon die and subjected to hot pressing sintering under nitrogen gas atmosphere at a temperature of 1800° C. and under a pressure of 400 kg/cm$^2$ for one hour. Similarly to Example 1, the density, thermal conductivity and 3-point bending strength of the resulting sintered bodies were measured, and the results are shown in Table 2.

EXAMPLES 30 to 33 and COMPARATIVE EXAMPLES 6 to 8

By changing the kind of AlN powder, hot pressing temperature and kind of sintering additive variously, AlN sintered bodies were prepared similarly to the above-mentioned Example 29, followed by measuring respective densities, thermal conductivities and 3-point bending strengths. The results are shown in Table 2, together with the particle diameter and oxygen content of each AlN powder, the kind of additives, particle diameter, amount to be added of each additive, and the color of each sintered body.

EXAMPLE 34

In the first place, to an AlN powder containing 3.6% by weight of oxygen as an impurity and having an average particle diameter of 2.2 μm, there were added 1.5% by weight of $TiO_2$ having an average particle diameter of 2.8 μm, as a first additive, and 1.5% by weight of $Y_2O_3$ powder having an average particle diameter of 2.5 μm, as a second additive, and the resulting mixture was ground and mixed by a ball mill to prepare a material. And then, 7% by weight of paraffin was added to this material, and the resulting material was granulated, followed by press-molding the granules under a pressure of 500 kg/cm$^2$ into a green compact of 30×30×8 mm. Next, this green compact was heated up to 700° C. under nitrogen atmosphere to remove the paraffin. Then, the resulting green compact was received into a carbon container, and subjected to atmospheric pressure sintering under nitrogen gas atmosphere, at 1700° C. for 2 hours to prepare an AlN sintered body.

And as to the resulting sintered body, similarly to Example 1, the density and thermal conductivity are shown in Table 3.

EXAMPLES 35 to 71 AND COMPARATIVE EXAMPLES 9 TO 13

By changing the kind of AlN powder and the kind of additive powder variously, AlN sintered bodies were prepared similarly to the above-described Example 34, followed by measuring respective densities and thermal conductivities. The results are shown in Table 3, together with the particle diameter and oxygen content of each AlN powder, the kind of additives, particle diameter and amount to be added of each additive.

TABLE 2

| | AlN powder | | | First additive | | | Second additive | | |
|---|---|---|---|---|---|---|---|---|---|
| | Average particle diameter (μm) | Oxygen content (% by weight) | Composition (% by weigth) | Kind | Average particle diameter (μm) | Composition (% by weight) | Kind | Average particle diameter (μm) | Composition (% by weight) |
| Example 29 | 1.2 | 1.0 | 96.5 | $CaCO_3$ | 2.0 | 0.5 | $ZrO_2$ | 3.0 | 3.0 |
| Example 30 | 2.2 | 3.0 | 88.0 | $MgCO_3$ | 1.8 | 2.0 | $ZrO_2$ | 3.0 | 10.0 |
| Example 31 | 2.2 | 3.0 | 87.0 | BeO | 2.0 | 3.0 | $ZrO_2$ | 3.0 | 10.0 |
| Example 32 | 1.5 | 1.4 | 96.0 | $CaCO_3$ | 2.0 | 1.0 | Zr | 3.5 | 3.0 |
| Example 33 | 1.5 | 1.4 | 98.0 | $CaCO_3$ | 2.0 | 1.0 | ZrN | 2.5 | 2.0 |
| Comparative example 6 | 1.2 | 1.0 | 100.0 | — | — | — | — | — | — |
| Comparative example 7 | 1.2 | 1.0 | 99.5 | $CaCO_3$ | 2.0 | 0.5 | — | — | — |
| Comparative example 8 | 1.2 | 1.0 | 97.0 | — | — | — | $ZrO_2$ | 3.0 | 3.0 |

| | Density (g/cm$^3$) | Thermal conductivity (W/m.k) | Strength (kg/mm$^2$) | Hot pressing temperature (°C.) | Color |
|---|---|---|---|---|---|
| Example 29 | 3.28 | 108 | 68 | 1800 | dark brown |
| Example 30 | 3.40 | 72 | 65 | 1900 | dark brown |
| Example 31 | 3.38 | 70 | 62 | 1750 | dark brown |
| Example 32 | 3.31 | 96 | 66 | 1850 | dark brown |
| Example 33 | 3.29 | 93 | 65 | 1750 | dark brown |
| Comparative example 6 | 3.26 | 72 | 46 | 1800 | white |
| Comparative example 7 | 3.26 | 110 | 43 | 1800 | grayish white |
| Comparative example 8 | 3.27 | 60 | 48 | 1800 | dark brown |

TABLE 3

| | AlN powder | | | First additive | | | Second additive | | |
|---|---|---|---|---|---|---|---|---|---|
| | Average particle diameter ($\mu$m) | Oxygen content (% by weight) | Composition (% by weight) | Kind | Average particle diameter ($\mu$m) | Composition (% by weight) | Kind | Average particle diameter ($\mu$m) | Composition (% by weight |
| Example 34 | 2.2 | 3.6 | 97.0 | $Y_2O_3$ | 2.5 | 1.5 | $TiO_2$ | 4.8 | 1.5 |
| Example 35 | 2.2 | 3.6 | 99.0 | $La_2O_3$ | 2.5 | 0.5 | $TiO_2$ | 2.8 | 0.5 |
| Example 36 | 2.2 | 3.6 | 99.0 | $CeO_2$ | 2.5 | 0.5 | $TiO_2$ | 2.8 | 0.5 |
| Example 37 | 2.2 | 3.6 | 98.0 | $Nd_2O_3$ | 2.5 | 1.0 | $TiO_2$ | 2.8 | 1.0 |
| Example 38 | 2.2 | 3.6 | 85.0 | $La_2O_3$ | 2.5 | 10.0 | $TiO_2$ | 2.8 | 5.0 |
| Example 39 | 1.2 | 1.4 | 97.0 | $La_2O_3$ | 2.5 | 2.0 | $TiO_2$ | 2.8 | 1.0 |
| Example 40 | 1.2 | 1.4 | 97.0 | $CeO_2$ | 2.5 | 2.0 | $TiO_2$ | 2.8 | 1.0 |
| Example 41 | 1.2 | 1.4 | 97.0 | $YF_3$ | 2.5 | 2.0 | $TiO_2$ | 2.8 | 1.0 |
| Example 42 | 1.6 | 2.4 | 95.0 | $YF_3$ | 2.5 | 2.5 | $TiO_2$ | 2.8 | 2.5 |
| Example 43 | 1.6 | 2.4 | 95.0 | $YF_3$ | 2.5 | 3.75 | $TiO_2$ | 2.8 | 1.25 |
| Example 44 | 1.6 | 2.4 | 90.0 | $LaF_3$ | 2.5 | 7.5 | $TiO_2$ | 2.8 | 2.5 |
| Example 45 | 2.2 | 3.6 | 97.0 | CaO | 2.0 | 1.5 | $TiO_2$ | 2.8 | 1.5 |
| Example 46 | 2.2 | 3.6 | 97.0 | BaO | 2.3 | 1.5 | $TiO_2$ | 2.8 | 1.5 |
| Example 47 | 2.2 | 3.6 | 97.0 | SrO | 2.3 | 1.5 | $TiO_2$ | 2.8 | 1.5 |
| Example 48 | 2.2 | 3.6 | 99.0 | CaO | 2.0 | 0.5 | $TiO_2$ | 2.8 | 0.5 |
| Example 49 | 1.2 | 1.4 | 95.0 | CaO | 2.0 | 4.2 | Ti | 3.5 | 0.8 |
| Example 50 | 1.2 | 1.4 | 95.0 | $CaF_2$ | 2.5 | 4.2 | Ti | 3.5 | 0.8 |
| Example 51 | 1.6 | 2.4 | 95.0 | $CaF_2$ | 2.5 | 2.5 | $TiO_2$ | 2.8 | 2.5 |
| Example 52 | 1.6 | 2.4 | 90.0 | $BaF_2$ | 2.5 | 7.5 | $TiO_2$ | 2.8 | 2.5 |
| Example 53 | 1.6 | 2.4 | 99.0 | $SrF_2$ | 2.5 | 0.75 | $TiO_2$ | 2.8 | 0.25 |
| Example 54 | 1.6 | 2.4 | 97.0 | $Y_2O_3$ | 2.5 | 1.5 | NiO | 2.5 | 1.5 |
| Example 55 | 1.6 | 2.4 | 97.0 | $YF_3$ | 2.5 | 1.5 | NiO | 2.5 | 1.5 |
| Example 56 | 1.6 | 2.4 | 95.0 | $CeO_2$ | 2.5 | 2.5 | NiO | 2.5 | 2.5 |
| Example 57 | 1.6 | 2.4 | 95.0 | $Pr_6O_{11}$ | 2.5 | 2.5 | NiO | 2.5 | 2.5 |
| Example 58 | 1.2 | 1.4 | 95.0 | $YF_3$ | 2.5 | 2.5 | Ni | 3.5 | 2.5 |
| Example 59 | 1.2 | 1.4 | 95.0 | $Y_2O_3$ | 2.5 | 4.0 | Ni | 3.5 | 1.0 |
| Example 60 | 1.6 | 2.4 | 97.0 | $LaF_3$ | 2.5 | 2.4 | NiO | 2.5 | 0.6 |
| Example 61 | 2.2 | 3.6 | 97.0 | CaO | 2.0 | 1.5 | NiO | 2.5 | 1.5 |
| Example 62 | 2.2 | 3.6 | 98.0 | BaO | 2.3 | 1.0 | NiO | 2.5 | 1.0 |
| Example 63 | 2.2 | 3.6 | 97.0 | SrO | 2.3 | 1.5 | NiO | 2.5 | 1.5 |
| Example 64 | 1.2 | 1.4 | 98.0 | $BaF_2$ | 2.5 | 1.0 | Ni | 3.5 | 1.0 |
| Example 65 | 1.2 | 1.4 | 98.0 | $CaF_2$ | 2.5 | 1.0 | NiO | 2.5 | 1.0 |
| Example 66 | 2.2 | 3.6 | 95.0 | $CeO_2$ | 2.5 | 4.0 | $Fe_2O_3$ | 2.0 | 1.0 |
| Example 67 | 2.2 | 3.6 | 95.0 | CaO | 2.0 | 3.5 | CoO | 2.5 | 1.5 |
| Example 68 | 2.2 | 3.6 | 93.0 | CaO | 2.0 | 5.6 | $Cr_2O_3$ | 2.0 | 1.4 |
| Example 69 | 2.2 | 3.6 | 85.0 | $Y_2O_3$ | 2.5 | 14.25 | $V_2O_5$ | 2.5 | 0.75 |
| Exampel 70 | 1.2 | 1.4 | 99.0 | $CeO_2$ | 2.5 | 0.8 | MnO | 1.8 | 0.2 |
| Example 71 | 1.2 | 1.4 | 95.0 | BaO | 2.3 | 3.0 | $Fe_2O_3$ | 2.0 | 2.0 |
| Comparative example 9 | 2.2 | 3.6 | 100.0 | — | — | — | — | — | — |
| Comparative example 10 | 2.2 | 3.6 | 97.0 | $Y_2O_3$ | 2.5 | 3.0 | — | — | — |
| Comparative example 11 | 2.2 | 3.6 | 97.0 | — | — | — | $TiO_2$ | 2.8 | 3.0 |
| Comparative example 12 | 2.2 | 3.6 | 97.0 | — | — | — | NiO | 2.5 | 3.0 |
| Comparative example 13 | 2.2 | 3.6 | 97.0 | CaO | 2.0 | 3.0 | — | — | — |

| | Density (g/cm$^3$) | Thermal conductivity (W/m.k) | Color |
|---|---|---|---|
| Example 34 | 3.29 | 69 | dark brown |
| Example 35 | 3.28 | 69 | " |
| Example 36 | 3.28 | 69 | " |
| Example 37 | 3.29 | 70 | " |
| Example 38 | 3.38 | 72 | " |
| Example 39 | 3.29 | 90 | " |
| Example 40 | 3.29 | 88 | " |
| Example 41 | 3.29 | 96 | " |
| Example 42 | 3.31 | 89 | " |
| Example 43 | 3.30 | 83 | " |
| Example 44 | 3.32 | 85 | " |
| Example 45 | 3.27 | 69 | " |
| Example 46 | 3.29 | 69 | " |
| Example 47 | 3.28 | 68 | " |
| Example 48 | 3.26 | 68 | " |
| Example 49 | 3.28 | 94 | " |
| Example 50 | 3.28 | 93 | " |
| Example 51 | 3.30 | 85 | " |
| Example 52 | 3.33 | 86 | " |

TABLE 3-continued

| | | | |
|---|---|---|---|
| Example 53 | 3.26 | 80 | " |
| Example 54 | 3.29 | 72 | dark gray |
| Example 55 | 3.27 | 76 | " |
| Example 56 | 3.29 | 68 | " |
| Example 57 | 3.29 | 68 | " |
| Example 58 | 3.31 | 105 | " |
| Example 59 | 3.29 | 102 | " |
| Example 60 | 3.29 | 74 | " |
| Example 61 | 3.27 | 70 | " |
| Example 62 | 3.28 | 69 | " |
| Example 63 | 3.28 | 70 | " |
| Example 64 | 3.26 | 92 | " |
| Exampel 65 | 3.27 | 95 | dark gray |
| Example 66 | 3.30 | 93 | " |
| Example 67 | 3.29 | 85 | " |
| Example 68 | 3.33 | 86 | " |
| Example 69 | 3.37 | 80 | " |
| Example 70 | 3.26 | 72 | " |
| Example 71 | 3.30 | 76 | " |
| Comparative example 9 | 2.12 | 8 | white |
| Comparative example 10 | 2.64 | 20 | " |
| Comparative example 11 | 2.30 | 15 | dark brown |
| Comparative example 12 | 2.64 | 20 | dark gray |
| Comparative example 13 | 2.78 | 26 | grayish white |

EXAMPLES 72 to 90

By changing the kind of AlN powder and kind of sintering additive powder variously, AlN sintered bodies were prepared similarly to the above-mentioned Example 34, and respective densities and thermal conductivities were measured similarly. The results are shown in Table 4, together with the particle diameter and oxygen content of each AlN powder, and the kind and amount to be added of each sintering additive.

TABLE 4

| | AlN powder | | | Additive | | | | |
|---|---|---|---|---|---|---|---|---|
| | Average particle diameter (μm) | Oxygen content (% by weight) | Composition (% by weight) | Composition of additive | Added amount (% by weight) | density (g/cm³) | Thermal conductivity (W/m.k) | Color |
| Example 72 | 2.2 | 3.6 | 95.0 | $Y_2O_3:SrO_2:Cr_2O_2$ = 5:4:1 | 5.0 | 3.31 | 73 | dark gray |
| Example 73 | 1.6 | 2.4 | 97.0 | $Y_2O_3:CaO:V_2O_5$ = 5:4:1 | 3.0 | 3.29 | 86 | dark gray |
| Example 74 | 2.2 | 3.6 | 95.0 | $YF_3:CaO:Cr_2O_3$ = 5:4:1 | 5.0 | 3.30 | 75 | dark gray |
| Example 75 | 2.2 | 3.6 | 95.0 | $Y_2O_3:CaO:NiO$ = 2:2:1 | 5.0 | 3.33 | 72 | dark gray |
| Example 76 | 2.2 | 3.6 | 95.0 | $Y_2O_3:La_2O_3:NiO$ = 1:1:1 | 5.0 | 3.34 | 70 | dark gray |
| Example 77 | 2.2 | 3.6 | 95.0 | $BaO:CaF_2:Ni$ = 2:1:2 | 5.0 | 3.31 | 69 | dark gray |
| Example 78 | 2.2 | 3.6 | 95.0 | $Y_2O_3:CaO:TiO_2$ = 2:2:1 | 5.0 | 3.32 | 70 | dark brown |
| Example 79 | 2.2 | 3.6 | 95.0 | $Y_2O_3:La_2O_3:TiO_2$ = 2:2:1 | 5.0 | 3.33 | 70 | dark brown |
| Example 80 | 2.2 | 3.6 | 95.0 | $CaO:BaO:Ti$ = 1:1:1 | 5.0 | 3.29 | 69 | dark brown |
| Example 81 | 2.2 | 3.6 | 97.0 | $Y_2O_3:CaO:V_2O_5$ = 5:4:1 | 3.0 | 3.29 | 70 | dark gray |
| Example 82 | 1.6 | 2.4 | 97.0 | $Y_2O_3:V_2O_5$ = 98:2 | 3.0 | 3.29 | 82 | dark gray |
| Example 83 | 1.6 | 2.4 | 96.0 | $CeO_2:MnO$ = 8:2 | 4.0 | 3.29 | 82 | dark gray |
| Example 84 | 2.2 | 3.6 | 95.0 | $YN:CaF:MnO$ = 5:4:1 | 5.0 | 3.31 | 74 | dark gray |
| Example 85 | 2.2 | 3.6 | 95.0 | $YN:Ca_3N_2:Cr_2O_3$ = 5:4:1 | 5.0 | 3.30 | 78 | dark gray |
| Example 86 | 2.2 | 3.6 | 95.0 | $YF_3:CaO:CrF_2$ = 5:4:1 | 5.0 | 3.29 | 75 | dark gray |
| Example 87 | 2.2 | 3.6 | 95.0 | $NiO:YF_3:CaO$ = 1:2:1 | 5.0 | 3.32 | 74 | dark gray |
| Example 88 | 2.2 | 3.6 | 95.0 | $Ni:YF_3:CaO$ = 1:2:1 | 5.0 | 3.35 | 73 | dark gray |
| Example 89 | 2.2 | 3.6 | 95.0 | $TiO_2:YF_3:CaO$ = 1:2:2 | 5.0 | 3.31 | 71 | dark brown |
| Example 90 | 2.2 | 3.6 | 96.0 | $Ti:YF_3:CaF_2$ = 1:2:2 | 4.0 | 3.30 | 69 | dark |

TABLE 4-continued

| AlN powder | | | Additive | | | | |
|---|---|---|---|---|---|---|---|
| Average particle diameter (μm) | Oxygen content (% by weight) | Composition (% by weight) | Composition of additive | Added amount (% by weight) | density ($g/cm^3$) | Thermal conductivity (W/m.k) | Color |
| | | | | | | | brown |

EXAMPLE 91

To the AlN powder used in Example 1, there were added 1.5% by weight of $Y_2O_3$ having an average particle diameter of 2.5 μm and 1.5% by weight of NiO having an average particle diameter of 2.5 μm, and the mixture was ground and mixed using a ball mill to prepare a material. Next, the material powder was press-molded under a pressure of 500 $kg/cm^2$ into a green compact having a diameter of 12 mm and a thickness of 10 mm. And then, the green compact was placed in a carbon die and subjected to hot pressing sintering under nitrogen gas atmosphere at a temperature of 1700° C. and under a pressure of 400 $kg/cm^2$ for one hour. Similarly to Example 1, the density and thermal conductivity of the resulting sintered body were measured, and the results are shown in Table 5.

EXAMPLES 92 and 93 AND COMPARATIVE EXAMPLES 14 to 18

By changing the kind of AlN powder and the kind of sintering additive powder variously, AlN sintered bodies were prepared similarly to the above-mentioned Example 91, followed by measuring respective densities and thermal conductivities. The results are shown in Table 5, together with the particle diameter and oxygen content of each AlN powder, the kind of additives, particle diameter and amount to be added of each additive.

TABLE 5

| | AlN powder | | | First additive | | | Second additive | | | | | |
|---|---|---|---|---|---|---|---|---|---|---|---|---|
| | Average particle diameter (μm) | Oxygen content (% by weight) | Composition (% by weight) | Kind | Average particle diameter (μm) | Composition (% by weight | Kind | Average particle diameter (μm) | Composition (% by weight | Density ($g/cm^3$) | Thermal conductivity (W/m.k) | Color |
| Example 91 | 2.2 | 3.6 | 97.0 | $Y_2O_3$ | 2.5 | 1.5 | NiO | 2.5 | 1.5 | 3.29 | 71 | dark gray |
| Example 92 | 2.2 | 3.6 | 97.0 | $Y_2O_3$ | 2.5 | 1.5 | $TiO_2$ | 2.8 | 1.5 | 3.29 | 69 | dark brown |
| Example 93 | 2.2 | 3.6 | 97.0 | CaO | 2.0 | 2.1 | $Fe_2O_3$ | 2.0 | 0.9 | 3.27 | 65 | dark gray |
| Comparative example 14 | 2.2 | 3.6 | 100.0 | — | — | — | — | — | — | 3.30 | 29 | " |
| Comparative example 15 | 2.2 | 3.6 | 97.0 | CaO | 2.0 | 3.0 | — | — | — | 3.27 | 45 | " |
| Comparative example 16 | 2.2 | 3.6 | 97.0 | $Y_2O_3$ | 2.5 | 3.0 | — | — | — | 3.27 | 45 | " |
| Comparative example 17 | 2.2 | 3.6 | 97.0 | — | — | — | NiO | 2.5 | 3.0 | 3.29 | 42 | " |
| Comparative example 18 | 2.2 | 3.6 | 97.0 | — | — | — | $TiO_2$ | 2.8 | 3.0 | 3.27 | 32 | dark brown |

EXAMPLE 94

In the first place, to an AlN powder containing 1.4% by weight of oxygen as an impurity and having an average particle diameter of 1.2 μm, there were added 5% by weight of mixed powder of $TiO_2$ and $Y_2O_3$ (weight ratio=1:1), and the resulting mixture was ground and mixed by ball mill to prepare a material. And then, 7% by weight of paraffin was added to this material, and the resulting material was granulated, followed by press-molding the granyles under a pressure of 500 $kg/cm^2$ into green compacts of 30×30×8 mm. Next, these green compacts were heated up to 700° C. under nitrogen gas atmosphere to remove the paraffin. Then, the resulting green compacts were placed in a carbon container, and subjected to atmospheric pressure sintering under an atmosphere of nitrogen gas, at 1600° C., 1650° C., 1700° C., 1750° C. and 1800° C. for 2 hours to prepare 5 kinds of AlN sintered bodies.

COMPARATIVE EXAMPLE 19

Five kinds of AlN sintered bodies were prepared similarly to Example 94 except for the use of a material prepared by adding 5% by weight of $Y_2O_3$ to the same AlN powder as used in the above-mentioned Example 94.

COMPARATIVE EXAMPLE 20

Five kinds of AlN sintered bodies were prepared similarly to Example 94 except for the use of a material prepared by adding 5% by weight of $TiO_2$ to the same AlN powder as used in the above-mentioned Example 94.

Figure 2:
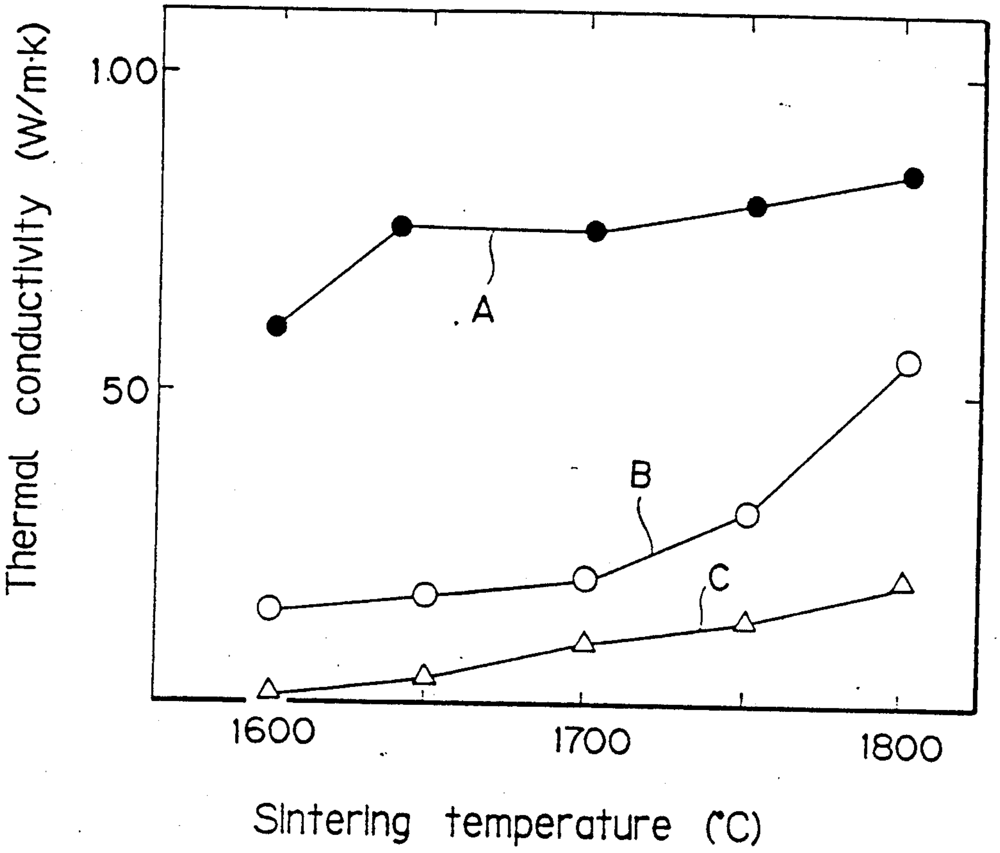
FIG. 2, FIG. 4, FIG. 6, FIG. 8 and FIG. 10 are characteristic diagrams showing the relationships of the sintering temperature of AlN sintered bodies prepared in Examples 94, 95, 96, 97 and 98, and Comparative Examples 19, 20, 21, 22 and 23, to the thermal conductivities thereof.

Then, as to the AlN sintered bodies of Example 94 of the present invention and Comparative examples 19 and 20, the investigation of the relationships of the densities and the thermal conductivities to sintering temperature was carried out to give the characteristic drawings shown in FIG. 1 and FIG. 2. In addition, A in FIG. 1 and FIG. 2 is a characteristic curve of Example 94 of the present invention, B is a characteristic curve of Comparative Example 19, and C is a characteristic curve of Comparative Example 20.

As is clear from FIG. 1 and FIG. 2, the AlN sintered bodies of the present invention can attain enhanced densities and increased thermal conductivities at lower temperatures, and the manufacturing costs thereof can be controlled to lower levels than those of conventional AlN sintered bodies.

EXAMPLE 95

To an AlN powder used in Example 94, there were added 4% by weight of mixed powder of $TiO_2$ and $CaCO_3$ (weight ratio=1:1; in terms of $TiO_2$:CaO), and the resulting mixture was ground and mixed by ball mill to prepare a material. And then, 7% by weight of paraffin was added to this material, and the resulting material was granulated, followed by press-molding the granules under a pressure of 500 kg/cm$^2$ into green compacts of 30×30×8 mm. Next, these green compacts were heated up to 700° C. under nitrogen gas atmosphere to remove the paraffin. Then, the resulting green compacts were placed in a carbon container, and subjected to atmospheric pressure sintering under nitrogen gas atmosphere at 1600° C., 1650° C., 1700° C., 1750° C. and 1800° C. for 2 hours to prepare 5 kinds of AlN sintered bodies.

COMPARATIVE EXAMPLE 21

Five kinds of AlN sintered bodies were prepared similarly to Example 95 except for the use of a material prepared by adding 4% by weight of $CaCO_3$ in terms of CaO to the same AlN powder as used in the above-mentioned Example 95.

Figure 3:
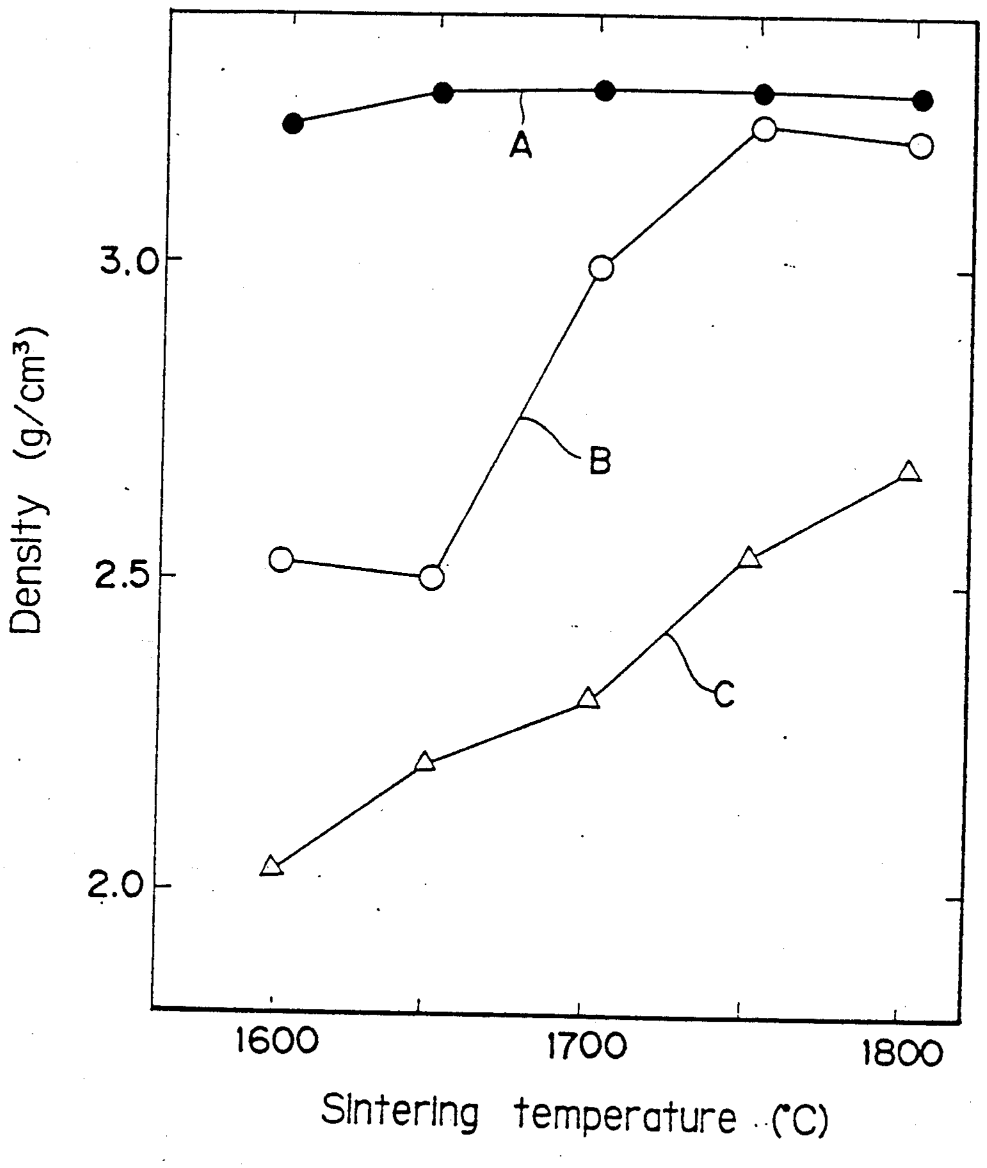
Figure 4:
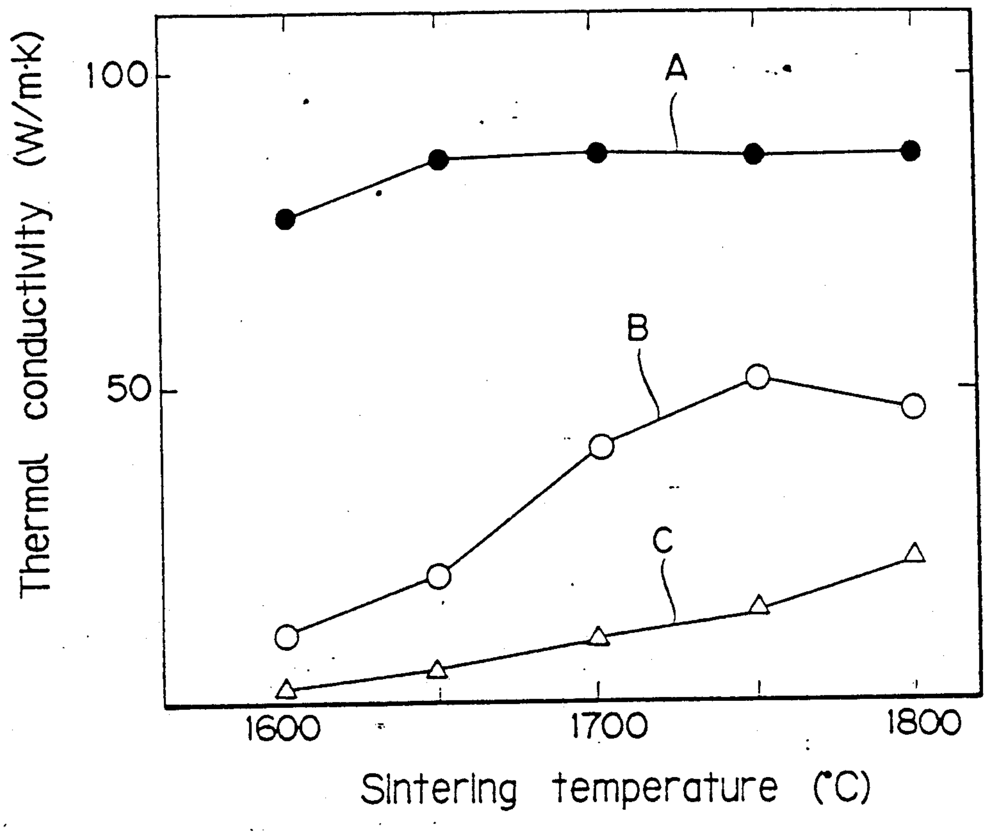

Then, as to the AlN sintered bodies of Example 95 of the present invention and Comparative examples 21, the investigation of the relationships of the densities and the thermal conductivities to sintering temperature was carried out to give the characteristic drawings shown in FIG. 3 and FIG. 4. A in FIG. 3 and FIG. 4 is a characteristic curve of Example 95 of the present invention, B is a characteristic curve of Comparative Example 21, and C is a characteristic curve of Comparative Example 20 described hereinbefore.

As is clear from FIG. 3 and FIG. 4, the AlN sintered bodies of the present invention can attain enhanced densities and increased thermal conductivities at lower temperatures, and the manufacturing costs thereof can be controlled to lower levels than those of conventional AlN sintered bodies.

EXAMPLE 96

Five kinds of AlN sintered bodies were obtained by preparing green compacts and making sintered bodies at various temperatures similarly to Example 94 except for the addition of 5% by weight of mixed powder of NiO and $Y_2O_3$ (weight ratio=1:1) to the same AlN powder as used in Example 94.

COMPARATIVE EXAMPLE 22

Five kinds of AlN sintered bodies were prepared similarly to Example 96 except for the use of a material prepared by adding 5% by weight of NiO alone to the same AlN powder as used in the above-mentioned Example 96.

Figure 5:
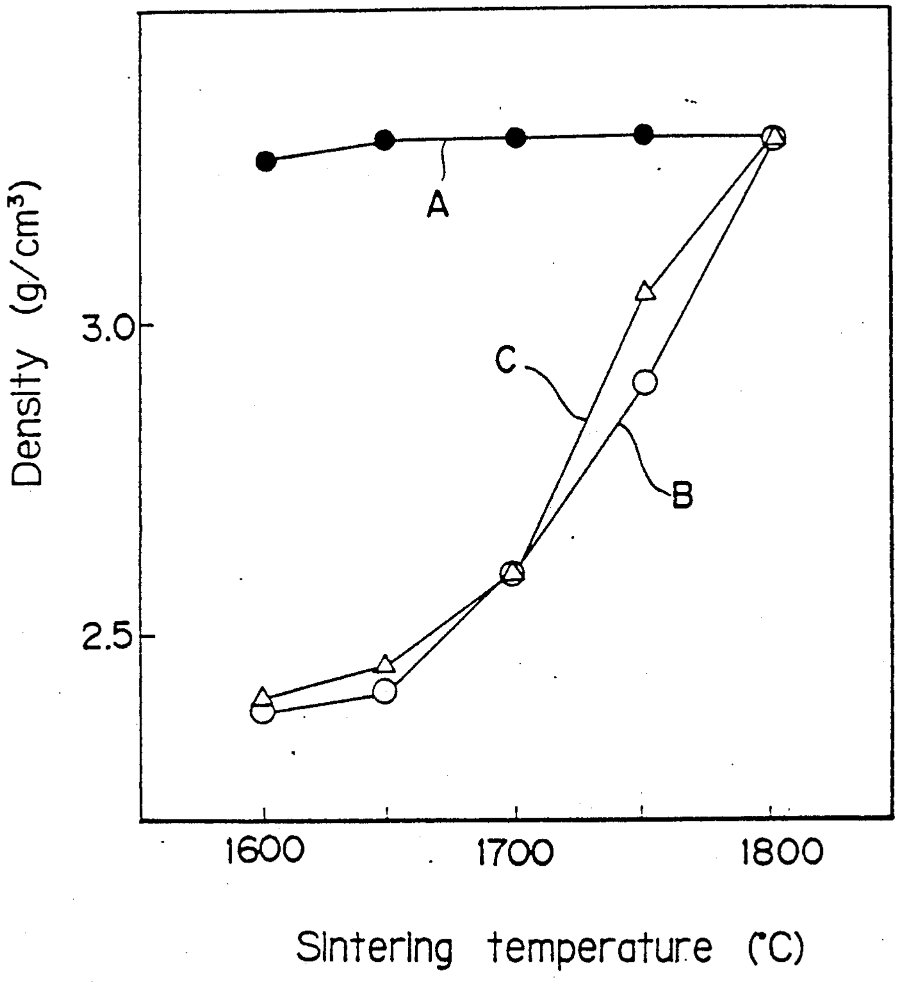
Figure 6:
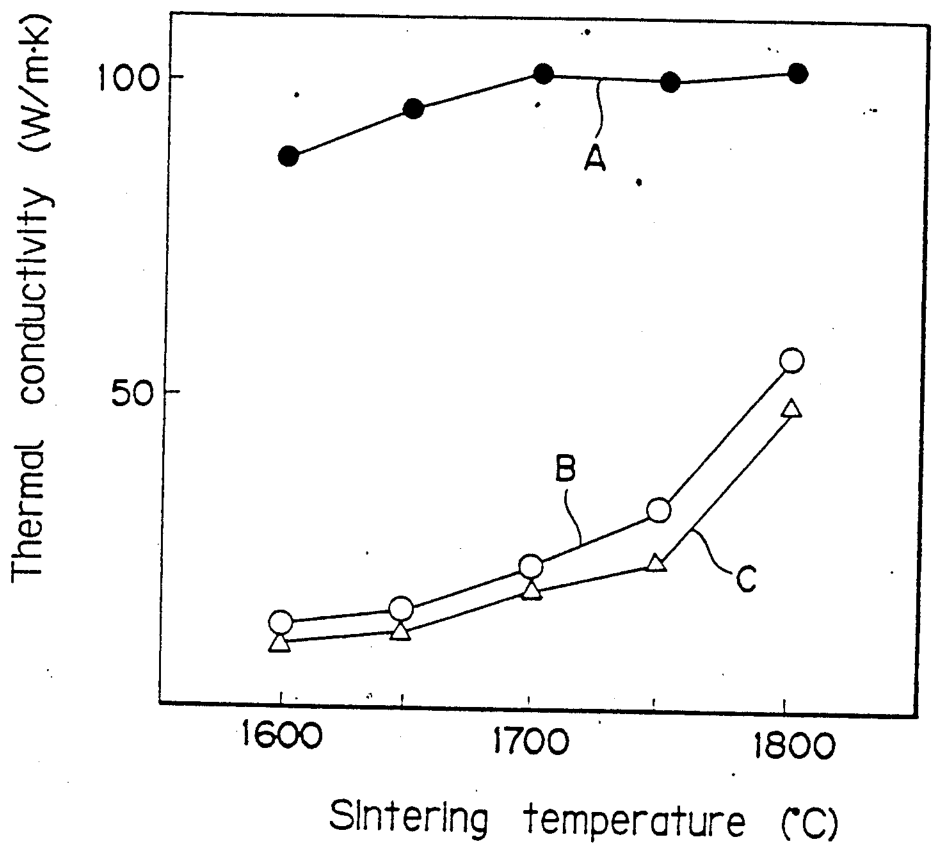

Then, as to the AlN sintered bodies of Example 96 of the present invention and Comparative examples 19 and 22, the investigation of the relationships of the densities and the thermal conductivities to the sintering temperature was carried out to give the characteristic drawings shown in FIG. 5 and FIG. 6. A in FIG. 5 and FIG. 6 is a characteristic curve of Example 96 of the present invention, B is a characteristic curve of Comparative example 19, and C is a characteristic curve of Comparative example 22 described hereinbefore.

As is clear from FIG. 5 and FIG. 6, in the AlN sintered bodies of the present invention, enhanced densities and increased thermal conductivities can be attained at lower sintering temperatures, and the manufacturing costs thereof can be controlled to lower levels than those of conventional AlN sintered bodies.

EXAMPLE 97

Five kinds of AlN sintered bodies were prepared by sintering at various temperatures similarly to Example 94 except for the use of a material prepared by adding 4% by weight of mixed powder of NiO and $CaCO_3$ (weight ratio in terms of NiO:CaO=1:1) to the same AlN powder as used in the above-mentioned Example 94.

Figure 7:
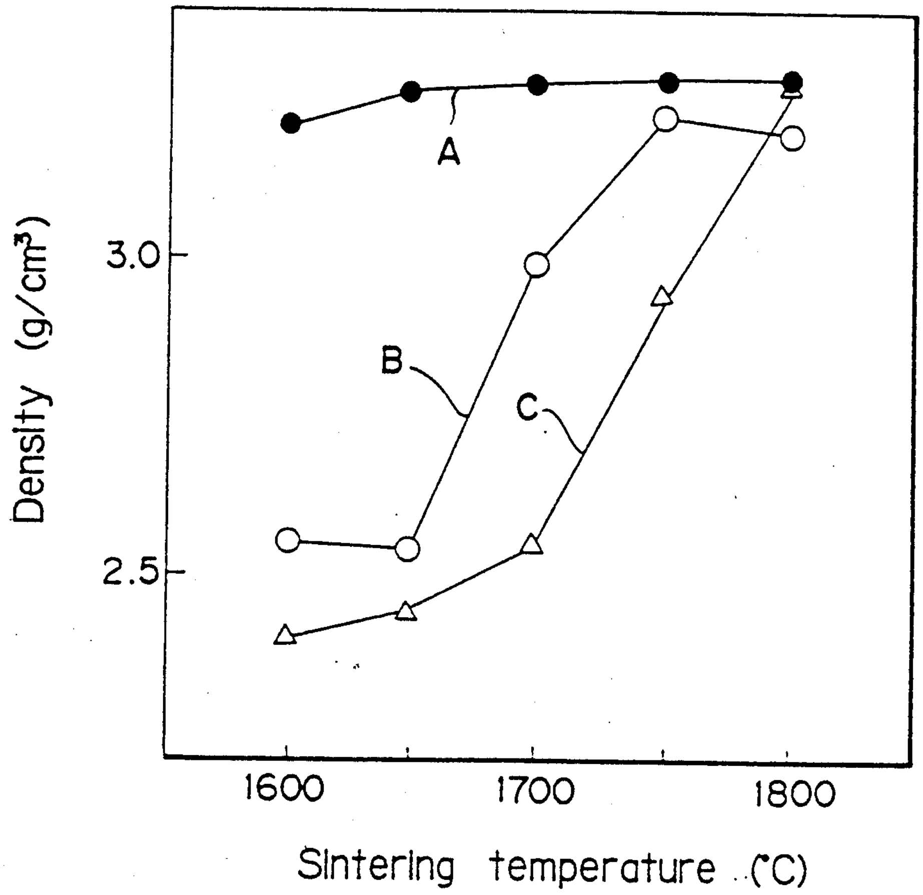
Figure 8:
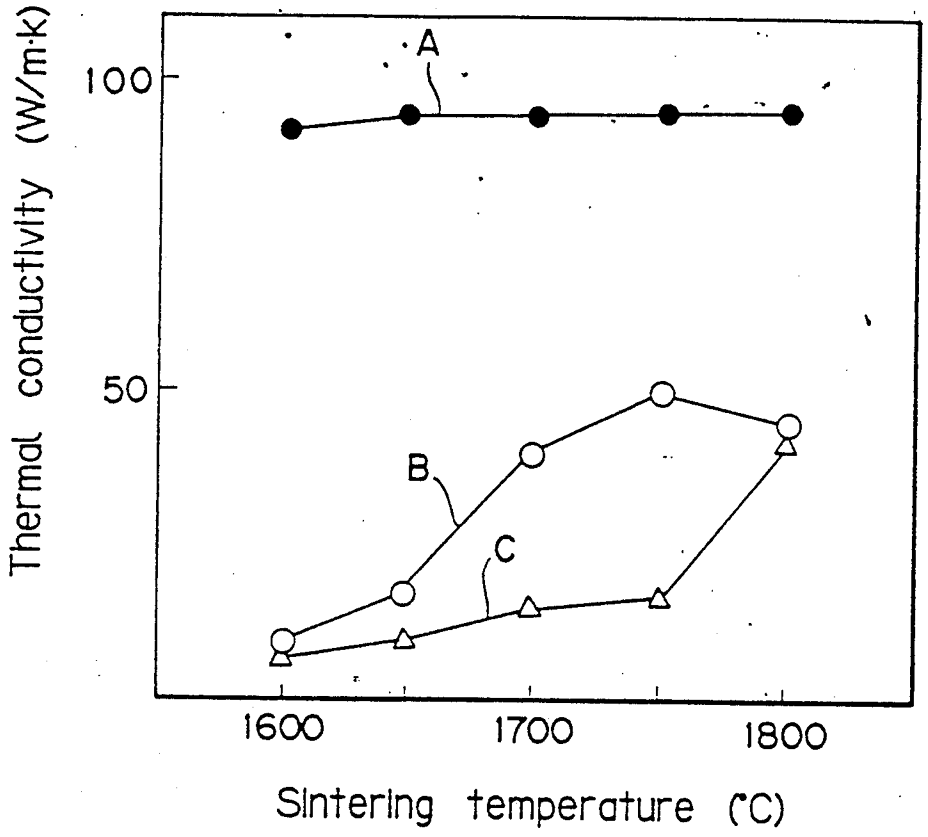

Then, as to the AlN sintered bodies of Example 97 of the present invention and Comparative examples 21 and 22, the investigation of the relationships of the densities and the thermal conductivities to the sintering temperature was carried out to give the characteristic drawings shown in FIG. 7 and FIG. 8. In addition, A in FIG. 7 or FIG. 8 is a characteristic curve of Example 97 of the present invention, B is a characteristic curve of Comparative example 21, and C is a characteristic curve of Comparative example 22, respectively.

As is clear from FIG. 7 and FIG. 8, in the AlN sintered bodies of the present invention, enhanced densities and increased thermal conductivities can be attained at lower sintering temperatures, and the manufacturing costs thereof can be controlled to lower levels than those of conventional AlN sintered bodies

EXAMPLE 98

Figure 9:
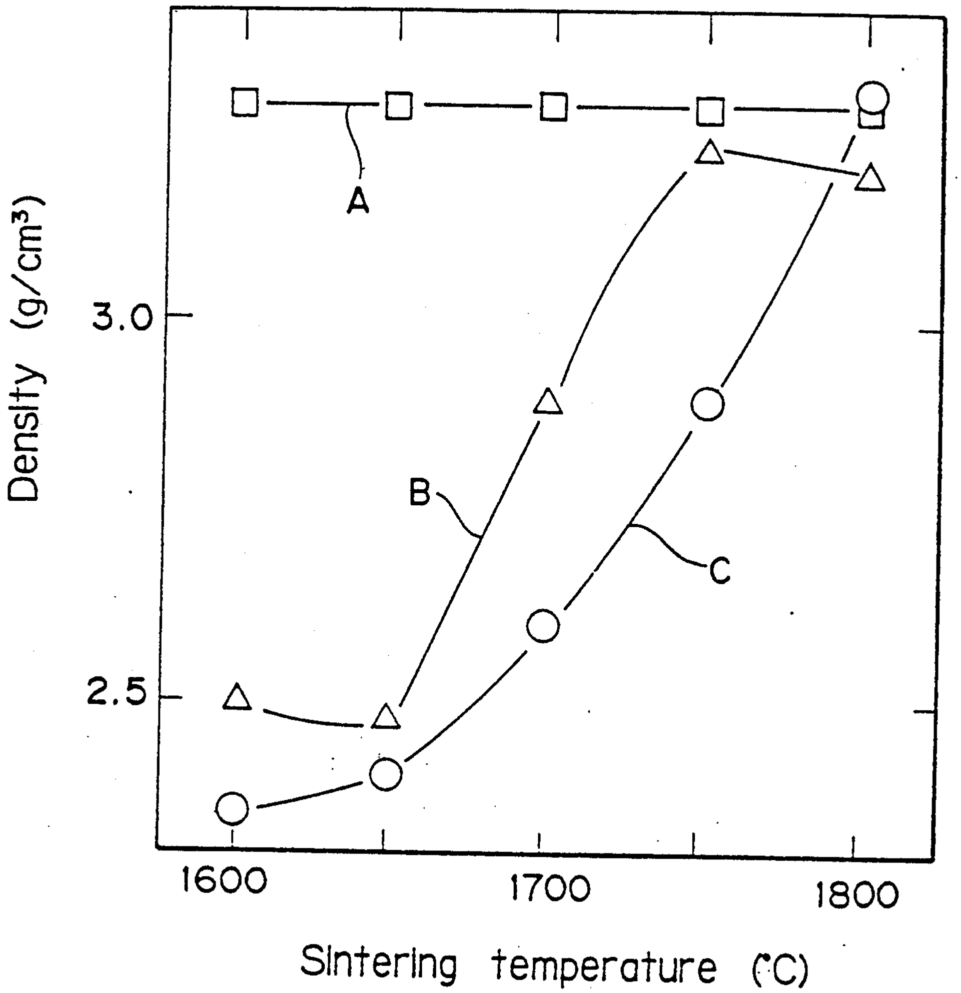
Figure 10:
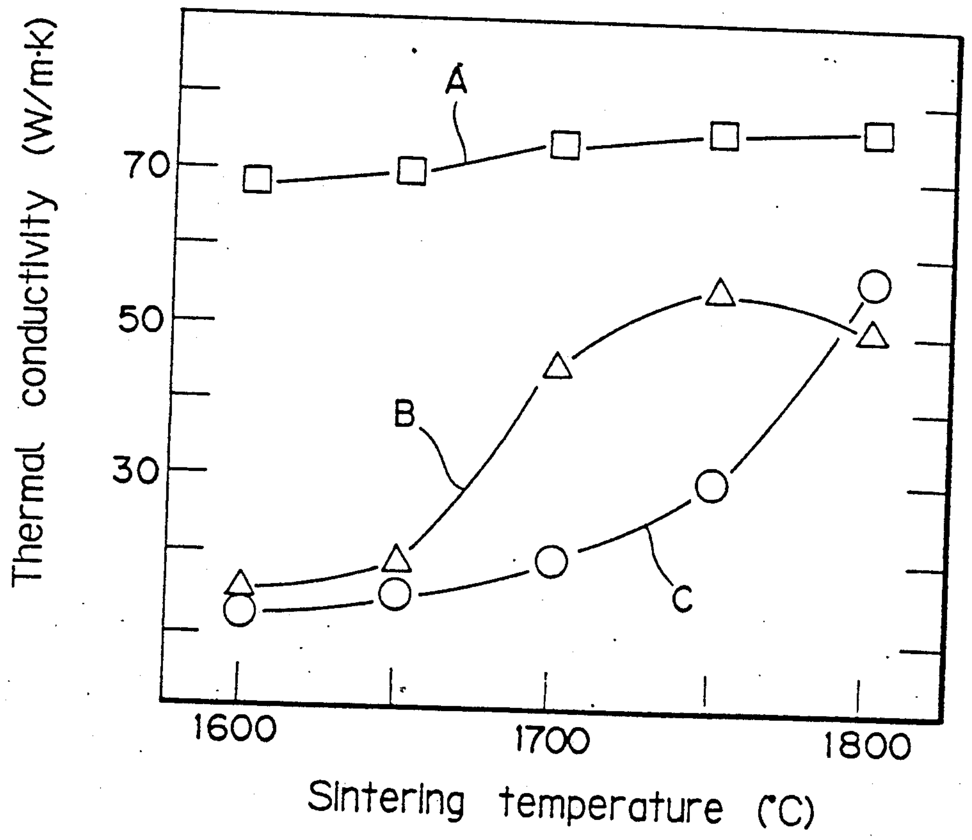

To an AlN powder containing 1.4% by weight of oxygen as an impurity and having an average particle diameter of 1.6 μm, there was added a mixed powder of $CaCO_3$ and $Fe_2O_3$ (weight ratio of $Fe_2O_3$:CaO=3:7) in the amount of 4% by weight in terms of $CaO+Fe_2O_3$, and similarly to the above-mentioned Example 94, the mixture was sintered at temperatures of 1600° C., 1650° C., 1700° C., 1750° C. and 1800° C., respectively, for 2 hours, and as to each of the resulting AlN sintered bodies, the density and thermal conductivity thereof were measured, the results thereof being indicated by curve A in FIG. 9 and FIG. 10.

COMPARATIVE EXAMPLE 23

For the purpose of comparison, by using the material powder prepared by adding 7.14% by weight (4.0% by weight in terms of CaO) of $CaCO_3$ to the same AlN powder as used in Example 98 and the material powder prepared by addition of 4% by weight of $Y_2O_3$, sintering was carried out at respective temperatures in a similar manner as above, and the densities and thermal conductivities of the resulting sintered bodies were measured, the results thereof being indicated by curve B and curve C, respectively, in FIG. 9 and FIG. 10.

As is clear from FIG. 9 and FIG. 10, in the manufacture of the sintered bodies of the present invention, the sintering temperature can be lowered to a great extent, and a high density and a good conductivity can be achieved; therefore, the manufacturing cost thereof can be controlled to a lower level than those of conventional AlN sintered bodies.

EXAMPLE 99

Figure 11:
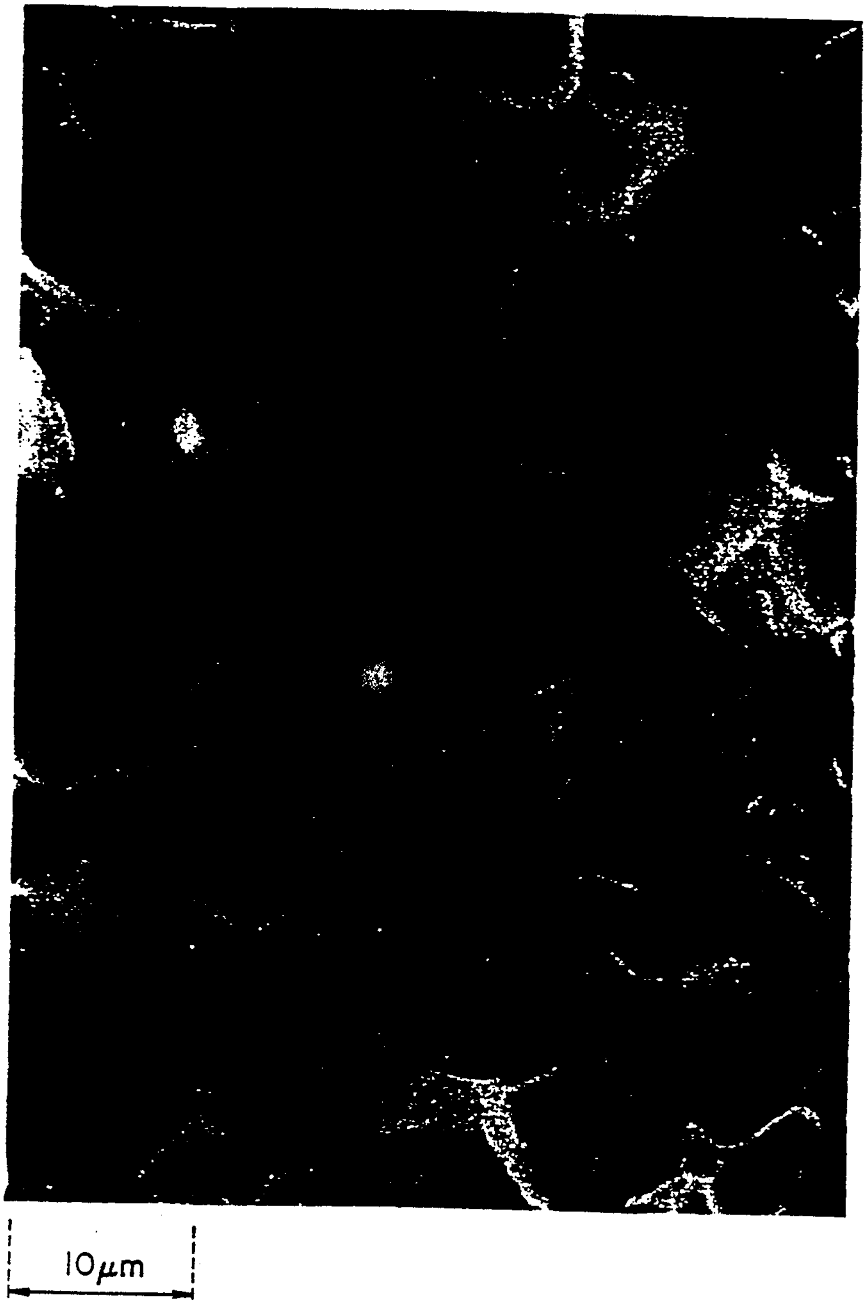
FIG. 11 is a SEM photograph of a sintered body added 3% by weight of $Y_2O_3$ and 0.5% by weight of $TiO_2$.

A sintered body comprising 3% by weight of $Y_2O_3$, 0.5% by weight of $TiO_2$ and aluminum nitride as the remainder was prepared in the same manner as mentioned in the preceding Examples. A SEM photograph of the sintered body are shown in FIG. 11. As seen from the photograph, it can be understood that uniform coloring with a dark color without unevenness can be realized since Ti component is dispersed uniformly.

As is evident from the above description, the aluminum nitride sintered bodies of the present invention are excellent products having a high density and a good thermal conductivity. And depending on the additives to be added, particularly on the kind of transition element, said second additive, such properties as being extremely strong, being capable of being sintered at low temperatures, etc. can be given thereto Further, depending on the kind of such transition elements and combination thereof, the present sintered bodies can be colored variously, which widens the range of use thereof as well as makes it possible to avoid lowering in yield thereof caused by non-uniformity in color of the sintered body, etc. Consequently, the industrial value thereof is extremely high and useful particularly for heat-dissipating substrates of semiconductor devices.

We claim:

1. An aluminum nitride sintered body prepared by sintering aluminum nitride and additives, which consists essentially of (a) aluminum nitride, (b) at least one compound selected from the group consisting of an aluminum compound of a rare earth metal and an aluminum compound of a rare earth metal and an alkaline earth metal, and (c) at least one material selected from the group consisting of titanium, zirconium, and a compound comprising titanium or zirconium, wherein said rare earth metal, said alkaline earth metal and said material are supplied by said additives, the content of constituent (b) is 0.01 to 18% by weight in terms of respective oxides of said rare earth and alkaline earth metal, and the content of constituent (c) is 0.01 to 15% by weight in terms of oxide of said material.

2. The aluminum nitride sintered body according to claim 1, wherein the content of aluminum nitride is 80 to 99.98% by weight.

3. The aluminum nitride sintered body according to claim 1 wherein said rare earth metal is selected from the group of consisting of Y, La and Ce.

4. The aluminum nitride sintered body according to claim 1, wherein said alkaline earth metal is selected from the group consisting of Ca, Sr and Ba.

5. The aluminum nitride sintered body according to claim 1, wherein at least one of compound selected from the group consisting of aluminum compound of a rare earth metal and an aluminum compound of a rare earth metal and an alkaline earth metal is an oxide and/or an oxyfluoride.

6. The aluminum nitride sintered body according to claim 1, wherein said sintered body has a darker color than a sintered body having the same composition as recited in claim 1 except for lacking said (c) component.

7. The aluminum nitride sintered body according to claim 6, wherein the color sintered body is selected from the group consisting of dark gray and dark brown.

8. The aluminum nitride sintered body according to claim 1, wherein said sintered body has a three-point bending strength of at least 52 $kg/mm^2$.

9. The aluminum nitride sintered body according to claim 1, wherein said sintered body has a thermal conductivity of at east 60 W/m k.

10. The aluminum nitride body according to claim 1, wherein said material comprises Ti.

* * * * *